United States Patent
Ferranti et al.

(10) Patent No.: US 10,073,749 B2
(45) Date of Patent: Sep. 11, 2018

(54) FAULT TOLERANT INDUSTRIAL AUTOMATION CONTROL SYSTEM

(71) Applicant: ABB Schweiz AG, Baden (CH)

(72) Inventors: Ettore Ferranti, Schleinikon (CH);
Manuel Oriol, Zürich (CH); Michael Wahler, Baden (CH); Thijmen de Gooijer, Västerås (SE); Thomas Gamer, Oftersheim (DE)

(73) Assignee: ABB Schweiz AG, Baden (CH)

( * ) Notice: Subject to any disclaimer, the term of this patent is extended or adjusted under 35 U.S.C. 154(b) by 27 days.

(21) Appl. No.: 14/959,392

(22) Filed: Dec. 4, 2015

(65) Prior Publication Data
US 2016/0085642 A1 Mar. 24, 2016

Related U.S. Application Data

(63) Continuation of application No. PCT/EP2014/062302, filed on Jun. 13, 2014.

(30) Foreign Application Priority Data

Jun. 14, 2013 (EP) .................................... 13172021

(51) Int. Cl.
| | | |
|---|---|---|
| G06F 11/20 | (2006.01) | |
| G05B 23/02 | (2006.01) | |
| G06F 11/16 | (2006.01) | |

(52) U.S. Cl.
CPC ........ *G06F 11/203* (2013.01); *G05B 23/0208* (2013.01); *G06F 11/1658* (2013.01); *G06F 2201/805* (2013.01)

(58) Field of Classification Search
CPC ............... G06F 11/203; G06F 11/2041; G06F 11/1658; G05B 23/0208; H04L 41/0856; H04L 69/40; H04L 67/1048
See application file for complete search history.

(56) References Cited

U.S. PATENT DOCUMENTS 6,434,679 B1 * 8/2002 de Bonis-Hamelin ...................... G06F 11/1666
711/101
7,302,608 B1 * 11/2007 Acharya ............ G06F 11/2041
714/13

(Continued)

FOREIGN PATENT DOCUMENTS

| EP | 2560060 A1 | 2/2013 |
| EP | 2703918 A1 | 3/2014 |

OTHER PUBLICATIONS

International Preliminary Report on Patentability & Written Opinion of the International Searching Authority Application No. PCT/EP2014/062302 Completed: Dec. 15, 2015; dated Dec. 23, 2015 7 pages.

(Continued)

*Primary Examiner* — Yolanda L Wilson
(74) *Attorney, Agent, or Firm* — Whitmyer IP Group LLC

(57) ABSTRACT

A combination of a component-based automation framework, software-based redundancy patterns, and a distributed, reliable runtime manager, is able to detect host failures and to trigger a reconfiguration of the system at runtime. This combined solution maintains system operation in case a fault occurs and, in addition, automatically restores fault tolerance by using backup contingency plans, and without the need for operator intervention or immediate hardware replacement. A fault-tolerant fault tolerance mechanism is thus provided, which restores the original level of fault tolerance after a failure has occurred—automatically and immediately, i.e., without having to wait for a repair or replacement of the faulty entity. In short, the invention delivers increased availability or uptime of a system at reduced costs and complexity for an operator or engineer by adapting automatically to a new environment.

4 Claims, 1 Drawing Sheet

(56) References Cited

U.S. PATENT DOCUMENTS

| | | | | |
|---|---|---|---|---|
| 2004/0255189 | A1* | 12/2004 | Chu | G06F 11/2051 |
| | | | | 714/13 |
| 2008/0301489 | A1* | 12/2008 | Li | G06F 11/2041 |
| | | | | 714/4.12 |
| 2009/0259741 | A1* | 10/2009 | Shen | G06F 11/0757 |
| | | | | 709/223 |
| 2009/0319596 | A1* | 12/2009 | Kumar | G06F 11/2033 |
| | | | | 709/202 |
| 2010/0257399 | A1* | 10/2010 | Brown | H04L 67/1095 |
| | | | | 714/4.1 |
| 2011/0022574 | A1* | 1/2011 | Hansen | G06F 11/2097 |
| | | | | 707/698 |
| 2012/0030503 | A1* | 2/2012 | Li | G06F 11/203 |
| | | | | 714/4.11 |
| 2012/0254652 | A1* | 10/2012 | Katiyar | H04L 41/0695 |
| | | | | 714/4.1 |

OTHER PUBLICATIONS

Fernando J. Barros: "An evolving hierarchical & modular approach to resilient software", Proceedings of the 2008 RISE/EFTS Joint International Workshop on Software Engineering for Resilient Systems, Serene 2008, Nov. 17, 2008, pp. 79-86, New York, New York.
European Search Report Application No. 13 17 2021 Completed: Nov. 15, 2013; dated Nov. 22, 2013 6 pages.
International Search Report and Written Opinion of the International Searching Authority Application No. PCT/EP2014/062302 Completed: Sep. 22, 2014; dated Sep. 26, 2014 10 pages.

* cited by examiner

FAULT TOLERANT INDUSTRIAL AUTOMATION CONTROL SYSTEM

FIELD OF THE INVENTION

The invention relates to the field of configuring and executing control applications in an Industrial Automation and Control System IACS. Specifically, it relates to an improved fault tolerance in such systems.

BACKGROUND OF THE INVENTION

In industrial systems or processes the costs of plant downtime are usually quite high. Accordingly, inacceptable downtime costs advocate for increased reliability and high availability of the corresponding Industrial Automation Control Systems. The latter usually rely on redundancy, with critical parts of a control system or critical control applications being replicated, and fault-tolerance of the control system resulting from a combination of redundancy and error detection mechanisms, such as supervision, watchdog, or heartbeat.

Existing redundancy patterns, such as Standby Redundancy or Triple-Modular Redundancy (TMR) are capable of providing fault tolerance to an automation control system. However these fault tolerance mechanisms lose or degrade fault-tolerance once a failure has occurred. The TMR pattern, for instance, tolerates a single fault. As with most other patterns, the original fault tolerance is not restored until the faulty entity is replaced. In the interim, upon occurrence of a second fault, TMR typically initiates a safety shutdown. Redundancy can also be deployed with more replicas to tolerate multiple faults. This comes at a higher cost and increased complexity, and is therefore rarely done.

In the patent application EP 12182884.2 control applications in or of an Industrial Automation and Control System IACS for controlling an industrial primary system or process, are configured and deployed in an optimal way. The IACS includes a plurality of execution hosts such as CPU-cores of single- or multi-core CPUs, and the control application is composed of a plurality of components or sub-applications. These components may be interrelated and executed at least partially in parallel. Eventually, the components may be assigned individually for execution to an execution host in a preset execution order depending on specific constraints, such as relative component execution timing. The resulting component-based software architecture provides a framework for cyclic real-time systems relying on static scheduling, allowing for loading components and modifying schedules at runtime.

DESCRIPTION OF THE INVENTION

It is an objective of the invention to improve fault tolerance in Industrial Automation Control Systems IACS. This objective is achieved by a method according to the independent claim. Preferred embodiments are evident from the dependent patent claims.

According to the invention, temporary fault tolerance degradation is prevented in an Industrial Automation and Control System IACS that includes a plurality of hosts, or controllers, connected to a communication bus for providing input data in parallel to at least some of the hosts. Each host executes a number of components as part of control applications in a cyclical manner and according to a configuration. The configuration includes a data structure comprising a static sequential schedule and an inter-component communication channel mapping, with the components being loadable at runtime and with the schedule being modifiable at runtime. Tolerance against faults such as host failures affecting at least one critical component is provided by executing the following steps executing an active instance, or replica, of a critical component on a first host and synchronizing a state of a redundant first standby instance of the critical component instantiated on a second host with the active component.

detecting a failure of the first host in a previous component execution cycle, by means of error detection mechanisms such as supervision, watchdog, or heartbeat;

activating, before a following component execution cycle, a first backup configuration, or a first contingency plan, including executing the first standby instance as the now active instance of the critical component on the second host, and including synchronizing a state of a redundant second standby instance of the critical component instantiated on, or loaded to, a third host with the first standby instance.

In other words, the invention includes a combination of a component-based automation framework, software-based redundancy patterns, and a distributed, reliable runtime manager, and is able to detect host failures and to trigger a reconfiguration of the system at runtime. This solution maintains system operation in case a fault occurs and, in addition, automatically restores fault tolerance against a further single controller failure by creating and scheduling new standby instances of the critical components on the available hosts, and without the need for operator intervention or immediate hardware replacement. A fault-tolerant fault tolerance mechanism is thus provided, which restores the original level of fault tolerance after a failure has occurred, automatically and immediately, i.e., without having to wait for a repair or replacement of the faulty entity. In short, the invention delivers increased availability or uptime of a system at reduced costs and complexity by adapting automatically to a new environment.

In a preferred variant of the invention, a second, or next-level, backup configuration is provided including a schedule involving a redundant third standby instance of the critical component assigned to and intended to be instantiated on, in case of failure of the second host, a forth host. Providing, or deriving, the second backup configuration involves calculating the deployment of the redundant instances of the critical components and defining the changes of schedules and inter-component communication channels in view of a second, or secondary, failure. The second backup configuration may be prepared at runtime and subsequent to the activation of a first backup configuration, i.e. departing from the actually activated first backup configuration and disregarding all other first backup configurations that were not activated. Alternatively, the second backup configuration may be prepared, or derived upfront, i.e. before occurrence of a first failure. This solution is computationally more expensive owing to the fact that a number of first backup configurations at least equal to the number of hosts has to be taken into account and suitably combined with a similar number of secondary failing hosts.

In an advantageous embodiment of the invention, each host is provided with first backup configurations during initialisation. All further working, or remaining, hosts then detect a failure of the first host individually, and instantaneously activate the first backup configuration corresponding to, or anticipating, a failure of the first host. This approach relies on a decentralized, distributed architecture in which all hosts or nodes having the necessary information about backup configuration plans covering all imaginable first failures. When a failure of a specific host occurs, this is detected and before the next component execution cycle, appropriate actions are taken by each remaining host concerned by the failure.

The present invention also relates to a computer program product including computer program code for controlling one or more processors of an Industrial Automation Control System including a plurality of execution hosts connected to a communication bus, particularly, a computer program product including a computer readable medium containing therein the computer program code.

BRIEF DESCRIPTION OF THE DRAWINGS

The subject matter of the invention will be explained in more detail in the following text with reference to preferred exemplary embodiments which are illustrated in the attached drawings, of which.

DETAILED DESCRIPTION OF PREFERRED EMBODIMENTS

Figure 1:
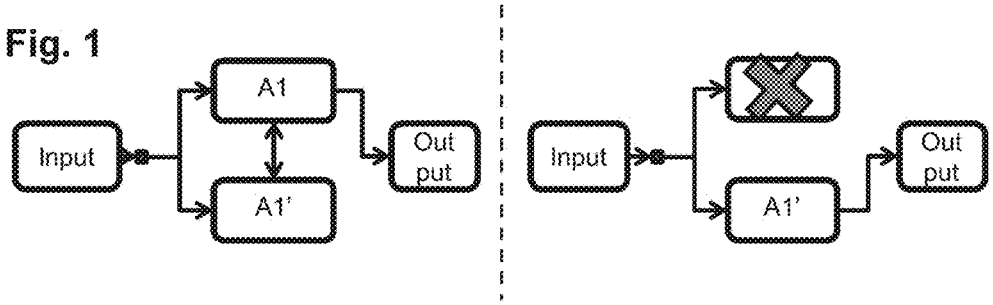
FIG. 1 illustrates a hot standby redundancy concept.

FIG. 1 presents a conventional deployment of a single critical component with hot standby redundancy involving two instances or replicas, where A1 is the active replica and A1' is the standby replica permanently synchronized with the active replica. Synchronization in the present context includes a state synchronization of the two instances with a state of the active instance A1 being gradually or continually transferred, or copied, to the standby instance A1' as indicated by the vertical arrow. In case the active replica A1 fails, the standby replica A1' thus is prepared to be activated instantaneously. Supervisory communication between the two hosts executing the replicas enables such automatic switchover.

Figure 2:
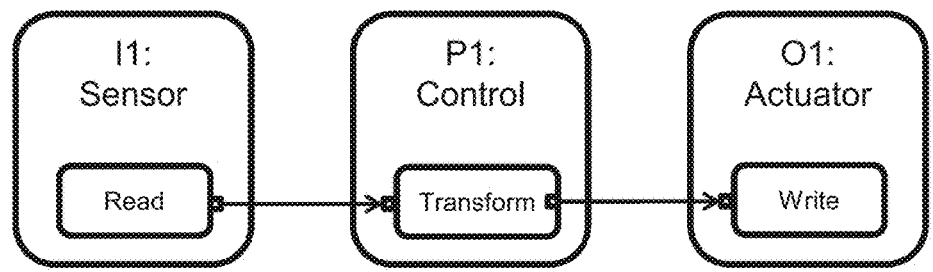
FIG. 2 depicts a simplified example of an industrial control application.

FIG. 2 illustrates a simplified example of an industrial control application that reads some input variable, performs calculations (e.g., a cascaded feedback loop), and finally writes some output to a fieldbus I/O interface. The application is executed cyclically at a given control frequency corresponding to exemplary cycle times of the order of 500 ms and consists of three components (large rounded rectangles) which are organizational units that also maintain state data. In the example, a new value for an input variable, e.g. a wave form, is read or acquired at the beginning of each cycle by a sensor component. The actual control algorithm is implemented by the control component, which performs some simple calculations that transform the input wave form. The computed output of the control component is fed into an actuator component, which prepares and writes a value for output to a fieldbus I/O interface.

Figure 3:
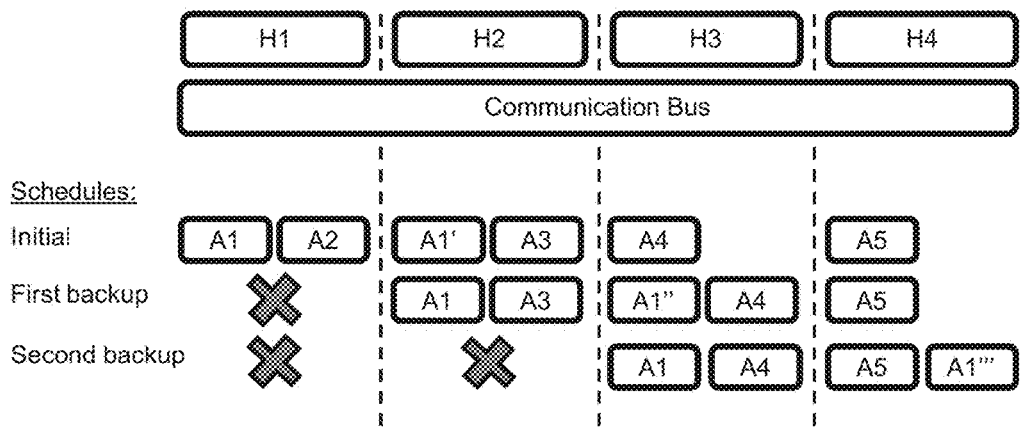
FIG. 3 shows a four-host execution environment of an Industrial Automation and Control System, and three corresponding component execution configuration schedules.

FIG. 3 shows, in the top part, an example of a hot standby system with four hosts H1, H2, H3, H4 connected through a communication bus that supports broadcast communication. Through this bus, each host sends a heartbeat at regular intervals. If the heartbeat of some host is missing (e.g., because of host failure or network failure), the other hosts can immediately react to the failure. In this example, the hosts run a total of five distinct components, of which one component is considered critical and therefore executed redundantly as instance A1 and A1' on hosts H1 and H2, see below.

A configuration is a data structure containing a static sequential schedule and an inter-component communication channel mapping. Multiple configurations can be stored on each host but at most one configuration is active, i.e., is being executed. The other configurations are called backup configurations. The global active configuration thereby defines which components are to be executed on which hosts during normal operation. The hosts can switch from the active configuration to any backup configuration at the beginning of each cycle in a disruption-free way. The possibility of having multiple configurations is used for storing multiple backup configurations, each one covering the failure of a single host in the system. This approach could be extended to multiple related host failures (i.e., failures that happen at the same point in time).

FIG. 3 depicts, in the bottom part, exemplary configuration schedules sequentially activated and/or created. In the initial schedule, critical component A1 is executed redundantly in a hot standby setup on host H1 (replica A1 active) and host H2 (replica A1' standby), while non-critical component instances A2 to A5 are executed on hosts H1 to H4, respectively. Out of a large number of first backup configurations which may become selectively effective upon occurrence of a specific failure, an exemplary first backup configuration provides fault tolerance against a failure of host 1 and to that effect involves activating the standby replica A1' on host H2. At the same time, the initial single host fault tolerance for an exemplary failure of host H2 is restored by scheduling, i.e. by loading or instantiating (if required) and synchronizing a second standby replica A1'' of the critical component on host H3. In addition, a second backup configuration providing fault tolerance for the critical component against a failure of host H3 is created, which in turn includes a schedule with a third standby replica A''' assigned to, and foreseen to be instantiated on, host H4.

To enable the creation of a new standby replica in the approach the relevant I/O signals of the automation process need to be available at the location of the new standby replica. Several solutions to this problem are foreseen to be used together with the invention such as wireless communication with the I/O units either directly or through a proxy (e.g., a router or repeater) and Ethernet based broadcast. Both communication techniques could be secured using technologies such as VLANs or VPN. Exemplary cycle times are of the order of 500 ms. Further details relating to the implementation of the invention are disclosed in a conference paper by Manuel Oriol et al., Fault-tolerant Fault Tolerance for Component-Based Automation Systems, to appear in Proceedings of the 4th International ACM SIGSOFT Symposium on Architecting Critical Systems (ISARCS 2013), Vancouver. Canada, 2013.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method of providing fault tolerance in an Industrial Automation and Control System IACS including a plurality of hosts connected to a communication bus, wherein each host executes cyclically a number of components according to a configuration, comprising the steps of:

executing an active instance of a critical component on a first host and synchronizing a first standby instance of the critical component instantiated on a second host with the active instance;

detecting a failure of the first host;

activating a first backup configuration including executing the first standby instance as the now active instance of the critical component on the second host, and including synchronizing therewith a second standby instance of the critical component instantiated on a third host;

providing first backup configurations to each host;

detecting a failure of the first host by all further hosts; and activating, at all further hosts, a first backup configuration corresponding to the failure of the first host.

2. The method of claim 1, comprising providing a second backup configuration including assigning a third standby instance of the critical component to a fourth host.

3. A computer program product including computer program code for controlling one or more processors of an Industrial Automation Control System IACS including a plurality of execution hosts connected to a communication bus, wherein each host executes cyclically a number of components according to a configuration, the program comprising the steps of:

executing an active instance of a critical component on a first host and synchronizing a first standby instance of the critical component instantiated on a second host with the active instance;

detecting a failure of the first host;

activating a first backup configuration including executing the first standby instance as the now active instance of the critical component on the second host, and including synchronizing therewith a second standby instance of the critical component instantiated on a third host;

providing first backup configurations to each host;

detecting a failure of the first host by all further hosts; and activating, at all further hosts, a first backup configuration corresponding to the failure of the first host.

4. An Industrial Automation System having one or more processors and a computer program product including computer program code for controlling the one or more processors to perform the following process steps: executing an active instance of a critical component on a first host and synchronizing a first standby instance of the critical component instantiated on a second host with the active instance; detecting a failure of the first host; activating a first backup configuration including executing the first standby instance as the now active instance of the critical component on the second host, and including synchronizing therewith a second standby instance of the critical component instantiated on a third host; providing first backup configurations to each host; detecting a failure of the first host by all further hosts; and activating, at all further hosts, a first backup configuration corresponding to the failure of the first host.

* * * * *